US012795496B2

(12) United States Patent
Fang et al.

(10) Patent No.: US 12,795,496 B2
(45) Date of Patent: Nov. 10, 2026

(54) HANDOVER METHOD, COMMUNICATION APPARATUS, AND COMPUTER STORAGE MEDIUM

(71) Applicant: HUAWEI TECHNOLOGIES CO., LTD., Shenzhen (CN)

(72) Inventors: Yuzhe Fang, Shenzhen (CN); Wenjie Peng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 188 days.

(21) Appl. No.: 18/610,217

(22) Filed: Mar. 19, 2024

(65) Prior Publication Data

US 2024/0224152 A1 Jul. 4, 2024

Related U.S. Application Data

(63) Continuation of application No. PCT/CN2022/118902, filed on Sep. 15, 2022.

(30) Foreign Application Priority Data

Sep. 30, 2021 (CN) .......................... 202111162361.2

(51) Int. Cl.
*H04W 36/32* (2009.01)
*H04W 36/14* (2009.01)
(Continued)

(52) U.S. Cl.
CPC ......... *H04W 36/324* (2023.05); *H04W 36/14* (2013.01); *H04W 64/006* (2013.01); *H04W 36/083* (2023.05)

(58) Field of Classification Search
CPC . H04W 36/324; H04W 36/14; H04W 64/006; H04W 36/083; H04W 36/08; H04W 36/32; H04W 36/322; H04W 36/00
See application file for complete search history.

(56) References Cited

U.S. PATENT DOCUMENTS 10,149,223 B2 12/2018 Guo
10,582,462 B2 * 3/2020 Wang .................. H04W 56/001
(Continued)

FOREIGN PATENT DOCUMENTS

CN 111866859 A 10/2020
CN 112787712 A 5/2021
(Continued)

OTHER PUBLICATIONS

3GPP TS 23.256 V1.0.0, 3rd Generation Partnership Project; Technical Specification Group Services and System Aspects; Support of Uncrewed Aerial Systems (UAS) connectivity, identification and tracking; Stage 2 (Release 17), Jun. 2021, total 39 pages.
(Continued)

*Primary Examiner* — Dhaval V Patel

(57) ABSTRACT

This application provides a handover method, a communication apparatus, and a computer storage medium. The method includes: A first access network device determines, based on coverage information of a neighboring access network device and route information of a terminal, a second access network device that can provide a communication service for the terminal, and sends a handover request message to the second access network device. Adaptation between a moving path of the terminal and a coverage range of a neighboring base station is considered in a process of determining a target access network device or a candidate target access network device, so that the terminal can be handed over to an access network device that matches the moving path of the terminal.

18 Claims, 9 Drawing Sheets

(51) Int. Cl.
*H04W 64/00* (2009.01)
*H04W 36/08* (2009.01)

(56) References Cited

U.S. PATENT DOCUMENTS

| | | | | |
|---|---|---|---|---|
| 11,900,980 | B2 * | 2/2024 | Visconti | G11C 11/2259 |
| 2011/0244862 | A1 | 10/2011 | Inumaru | |
| 2015/0036657 | A1 | 2/2015 | Hong et al. | |
| 2021/0014755 | A1 * | 1/2021 | Caceres | H04W 36/0038 |
| 2021/0045027 | A1 * | 2/2021 | Hong | H04W 36/08 |
| 2021/0084558 | A1 * | 3/2021 | Speicher | H04W 36/22 |
| 2021/0168664 | A1 * | 6/2021 | Otaka | H04W 36/0005 |
| 2024/0163738 | A1 * | 5/2024 | Cui | H04W 36/08 |

FOREIGN PATENT DOCUMENTS

| | | | |
|---|---|---|---|
| EP | 3646481 | B1 | 5/2020 |
| JP | 2015233324 | A | 12/2015 |
| WO | 2010071126 | A1 | 6/2010 |
| WO | 2012086621 | A1 | 6/2012 |
| WO | 2021174281 | A1 | 9/2021 |
| WO | 2021184281 | A1 | 9/2021 |

OTHER PUBLICATIONS

Huawei:"NTN-NTN and NTN-TN mobility." 3GPP TSG RAN WG3 Meeting#113-e, E-meeting, Aug. 16-26, 2021. R3-213345, total 2 pages.

3GPP TS 23.401 V16.11.0, 3rd Generation Partnership Project; Technical Specification Group Services and System Aspects; General Packet Radio Service (GPRS) enhancements for Evolved Universal Terrestrial Radio Access Network (E-UTRAN) access (Release 16), Sep. 2021, total 435 pages.

3GPP TS 23.501 V17.2.0, 3rd Generation Partnership Project; Technical Specification Group Services and System Aspects; System architecture for the 5G System (5GS); Stage 2 (Release 17), Sep. 2021, total 534 pages.

3GPP TS 38.300 V16.7.0, 3rd Generation Partnership Project; Technical Specification Group Radio Access Network; NR; NR and NG-RAN Overall Description; Stage 2 (Release 16), Sep. 2021, total 147 pages.

3GPP TS 38.423 V16.6.0, 3rd Generation Partnership Project; Technical Specification Group Radio Access Network; NG-RAN; Xn application protocol (XnAP) (Release 16), Jul. 2021, total 464 pages.

* cited by examiner

HANDOVER METHOD, COMMUNICATION APPARATUS, AND COMPUTER STORAGE MEDIUM

CROSS-REFERENCE TO RELATED APPLICATIONS

This application is a continuation of International Application No. PCT/CN2022/118902, filed on Sep. 15, 2022, which claims priority to Chinese Patent Application No. 202111162361.2, filed on Sep. 30, 2021. The disclosures of the aforementioned applications are hereby incorporated by reference in their entireties.

TECHNICAL FIELD

This application relates to the field of communication technologies, and in particular, to a handover method, a communication apparatus, and a computer storage medium.

BACKGROUND

To maintain communication quality, a terminal may perform cell handover in a movement process. For example, a source base station may determine, based on a neighboring cell measurement result reported by the terminal, to hand over the terminal from a serving cell to a cell managed by a target base station.

As various types of terminals such as drone devices are applied to wireless communication, a serving cell, a neighboring cell relationship, and the like of the terminal greatly change compared with those in a conventional wireless communication scenario. Consequently, using a conventional handover method may cause a poor handover effect and affect communication quality.

SUMMARY

Embodiments of this application provide a handover method, a communication apparatus, and a computer storage medium, to improve communication quality in a handover scenario.

According to a first aspect, this application provides a handover method, including: A first access network device obtains first information, where the first information includes coverage information of at least one access network device adjacent to the first access network device; the first access network device receives route information from a terminal; the first access network device determines a second access network device from the at least one access network device based on the first information and the route information; and the first access network device sends a handover request to the second access network device, where the handover request is used for requesting to hand over the terminal from the first access network device to the second access network device.

In a possible implementation of the first aspect, the method further includes: The first access network device receives a handover request response from a second access network device.

Optionally, the handover request response includes indication information, and the indication information indicates a possibility that the second access network device provides a communication service for the terminal.

In a possible implementation of the first aspect, the method further includes: The first access network device sends a conditional handover configuration to the terminal, where the conditional handover configuration includes information about at least one candidate cell, and a condition to be met for determining to hand over the terminal to any candidate cell in the at least one candidate cell, and a part or all of the at least one candidate cell are managed by the second access network device.

In a possible implementation of the first aspect, that a first access network device obtains first information includes: The first access network device receives the first information from operation, administration, and maintenance (OAM).

In a possible implementation of the first aspect, that a first access network device obtains first information includes: The first access network device receives coverage information of the first access network device from OAM, and the first access network device separately receives coverage information of the at least one access network device from the at least one access network device, where the at least one access network device separately receives the respective coverage information from the OAM.

Optionally, the first access network device obtains the coverage information of the at least one access network device from an interface setup request message.

In a possible implementation of the first aspect, the method further includes: The first access network device receives updated coverage information of the first access network device from the OAM; and the first access network device separately sends the updated coverage information of the first access network device to the at least one access network device.

In a possible implementation of the first aspect, that the first access network device determines the second access network device from the at least one access network device based on the coverage information and the route information includes: determining a moving direction of the terminal based on the route information; determining one or more candidate access network devices in the moving direction of the terminal based on the coverage information of the at least one access network device; and determining the second access network device from the candidate access network devices.

In a possible implementation of the first aspect, that the first access network device determines the second access network device from the at least one access network device based on the coverage information and the route information includes: determining a moving path of the terminal based on the route information; determining a coverage range of the at least one access network device based on the coverage information of the at least one access network device; and determining an access network device whose coverage range overlaps the moving path of the terminal as the second access network device.

According to a second aspect, this application provides a handover method, including: A second access network device receives a handover request from a first access network device, where the handover request is used for requesting to hand over a terminal from the first access network device to the second access network device, the second access network device is adjacent to the first access network device, the second access network device is determined by the first access network device based on first information and route information of the terminal, and the first information includes coverage information of at least one access network device adjacent to the first access network device.

In a possible implementation of the second aspect, the method further includes: The second access network device sends a handover request response to a first access network device.

Optionally, the handover request response includes indication information, and the indication information indicates a possibility that the second access network device provides a communication service for the terminal.

In a possible implementation of the first aspect or the second aspect, the first information further includes the coverage information of the first access network device.

Optionally, the coverage information of the first access network device includes location information of the first access network device, and/or coverage range information of a cell managed by the first access network device.

In a possible implementation of the first aspect or the second aspect, coverage information of any one of the at least one access network device includes location information of the access network device, and/or coverage range information of a cell managed by the access network device.

In a possible implementation of the first aspect or the second aspect, the terminal is a drone terminal, and the route information includes a flight path of the drone terminal.

According to the handover method provided in the first aspect or the second aspect, the first access network device determines, based on the coverage information of the neighboring access network device and the route information of the terminal, the second access network device that can provide a communication service for the terminal, and sends a handover request message to the second access network device. Adaptation between the moving path of the terminal and a coverage range of the neighboring access device is considered in a process of determining a target access network device or a candidate target access network device, so that the terminal can be handed over to an access network device that matches the moving path of the terminal. This improves a handover effect and communication quality.

According to a third aspect, this application provides a handover method, including: A first access network device obtains coverage information of the first access network device; the first access network device receives a handover request from a second access network device, where the handover request includes route information of a terminal, and the handover request requests to hand over the terminal from the second access network device to the first access network device; the first access network device determines, based on the coverage information and the route information, whether the first access network device can provide a communication service for the terminal; and when the first access network device determines that the first access network device can provide a communication service for the terminal, the first access network device sends a handover request response to a second access network device.

In a possible implementation of the third aspect, the method further includes: When the terminal determines, based on a conditional handover configuration, to be handed over to a first candidate cell managed by the first access network device, the first access network device performs time synchronization with the terminal; and the conditional handover configuration includes information about at least one candidate cell, and a condition to be met for determining to hand over the terminal to any candidate cell in the at least one candidate cell, and a part or all of the at least one candidate cell are managed by the first access network device.

In a possible implementation of the third aspect, the method further includes: When the first access network device determines that the first access network device cannot provide a communication service for the terminal, the first access network device sends, to the second access network device, indication information indicating that the first access network device cannot provide a communication service for the terminal.

In a possible implementation of the third aspect, that a first access network device obtains coverage information includes: The first access network device receives the coverage information from OAM.

In a possible implementation of the third aspect, that a first access network device obtains coverage information includes: The first access network device receives the coverage information from the second access network device.

In a possible implementation of the third aspect, the method further includes: The first access network device receives updated coverage information from the OAM or the second access network device.

In a possible implementation of the third aspect, that the first access network device determines, based on the coverage information and the route information, whether the first access network device can provide a communication service for the terminal includes: determining a moving direction of the terminal based on the route information, and determining, based on the coverage information, whether the first access network device is located in the moving direction of the terminal.

In a possible implementation of the third aspect, that the first access network device determines, based on the coverage information and the route information, whether the first access network device can provide a communication service for the terminal includes: determining a coverage range of the first access network device based on the coverage information, determining, based on the route information, whether a moving path of the terminal overlaps the coverage range, and determining whether the terminal is to pass through the coverage range of the first access network device.

According to a fourth aspect, this application provides a handover method, including: A second access network device sends a handover request to a first access network device, where the handover request includes route information of a terminal, and the handover request requests to hand over the terminal from the second access network device to the first access network device; and when the first access network device determines, based on coverage information and the route information, that the first access network device can provide a communication service for the terminal, the second access network device receives a handover request response from a first access network device.

In a possible implementation of the fourth aspect, the method further includes: when the first access network device determines that the first access network device cannot provide a communication service for the terminal, receiving, from the first access network device, indication information indicating that the first access network device cannot provide a communication service for the terminal.

In a possible implementation of the fourth aspect, the method further includes: The second access network device sends the coverage information to the first access network device.

In a possible implementation of the third aspect or the fourth aspect, the coverage information of the first access network device includes location information of the first access network device, and/or direction information and coverage information of a cell managed by the first access network device.

In a possible implementation of the third aspect or the fourth aspect, the terminal is a drone terminal, and the route information includes a flight path of the drone terminal.

According to the handover method provided in the third aspect or the fourth aspect, the first access network device receives, from the second access network device, the handover request that includes the route information of the terminal, so that the first access network device determines, based on the route information of the terminal and the coverage information of the first access network device, whether the first access network device can provide a communication service for the terminal. When determining that the first access network device can provide a communication service for the terminal, the first access network device sends the handover request response to the second access network device, so that the terminal can be handed over to an access network device whose coverage range matches the moving path of the terminal. This improves a handover effect and communication quality.

According to a fifth aspect, this application further provides a communication apparatus, including units, modules, or means (means) configured to perform the steps in the first aspect to the fourth aspect. The communication apparatus may be a network device or an apparatus used for a network device. The network device may be a base station or a device having some functions of a base station.

According to a sixth aspect, this application further provides a communication apparatus, including a processor and an interface circuit. The processor is configured to: communicate with another apparatus through the interface circuit, and perform the method according to the first aspect to the fourth aspect. There are one or more processors.

According to a seventh aspect, this application further provides a communication apparatus, including a processor, configured to invoke a program stored in a memory, to perform the method according to the first aspect to the fourth aspect. The memory may be located inside or outside the apparatus. In addition, there are one or more processors.

According to an eighth aspect, this application further provides a computer program product. When a program is invoked by a processor, the method according to any one of the foregoing aspects is performed.

In addition, a computer-readable storage medium is provided, including the foregoing program.

According to a ninth aspect, this application provides a communication system, including a first access network device and a second access network device, where the first access network device is configured to perform the method according to the first aspect, and the second access network device is configured to perform the method according to the second aspect; or the first access network device is configured to perform the method according to the third aspect, and the second access network device is configured to perform the method according to the fourth aspect.

DESCRIPTION OF EMBODIMENTS

Figure 1:
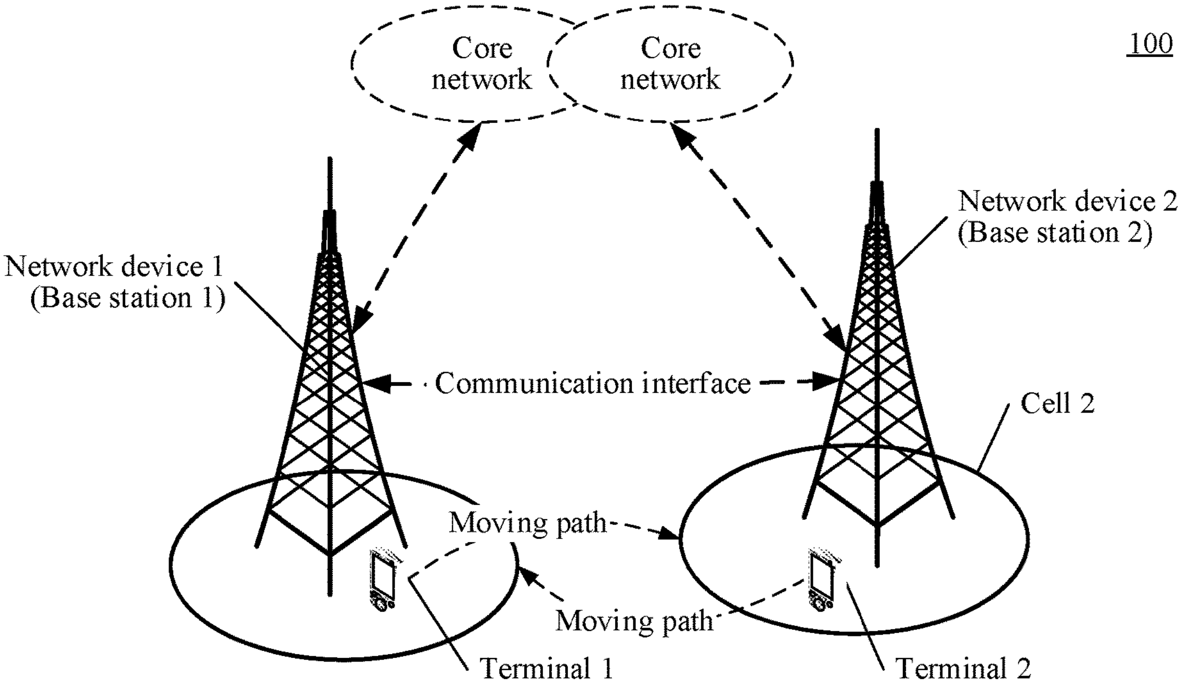
FIG. 1 is a schematic diagram of a communication system 100 according to an embodiment of this application.

FIG. 1 is a schematic diagram of a communication system 100 according to an embodiment of this application.

As shown in FIG. 1, the communication system 100 includes a network device 1 and a network device 2. The network device 1 and the network device 2 may directly communicate with each other, for example, may communicate with each other through a direct communication interface, or may indirectly communicate with each other via another network device. Each network device manages one or more cells. A coverage range of each cell may cover one or more terminals. The terminal accesses the network device via the cell and obtains a communication service. In FIG. 1, that the network device 1 manages a cell 1, and a terminal 1 is located in the cell 1; and the network device 2 manages a cell 2, and a terminal 2 is located in the cell 2 is used for illustration.

The communication system in this application may be a radio access network, for example, may be a long term evolution (LTE) wireless communication system, a 5th generation (5G) mobile communication system such as a new radio (NR) system, or another next generation (NG) communication system or a new communication system. This is not limited in this application.

In this application, the terminal may be various devices that provide voice and/or data connectivity for a user, or may be referred to as a terminal device, user equipment (UE), a mobile station, a mobile terminal, or the like. The terminal may be widely applied to various scenarios such as device-to-device (D2D), vehicle-to-everything (V2X) communication, machine type communication (MTC), an Internet of Things (IOT), virtual reality, augmented reality, industrial control, self-driving, remote medical, smart grid, smart furniture, smart office, a smart wearable device, smart transportation, and smart city. The terminal may be a mobile phone, a tablet computer, a computer with a wireless transceiver function, a wearable device, an aerospace device, or the like. In embodiments of this application, a chip used in the foregoing device may also be referred to as a terminal.

The aerospace device may be a drone terminal or another flying device with a wireless communication module. The drone terminal may also be referred to as drone user equipment (drone UE), or an unmanned aerial vehicle (UAV).

In this application, the network device may be an access network device. The network device may be a base station, an evolved NodeB (eNodeB), a transmission reception point (TRP), a next generation NodeB (gNB) in a 5th generation (5G) mobile communication system, a next generation NodeB in a 6th generation (6G) mobile communication system, a base station in a future mobile communication system, or the like; or may be a module or a unit that implements some functions of a base station, for example, may be a central unit (CU), or may be a distributed unit (DU). The CU herein implements functions of a radio resource control protocol and a packet data convergence protocol (PDCP) of a base station, and may further implement functions of a service data adaptation protocol (SDAP). The DU completes functions of a radio link control layer and a medium access control (MAC) layer of a base station, and may further complete functions of a part or all of a physical layer. For specific descriptions of the foregoing protocol layers, refer to technical specifications related to a 3rd generation partnership project (3GPP). A radio access network device may be a macro base station, may be a micro base station or an indoor base station, or may be a relay node, a donor node, or the like. A specific technology and a specific device form that are used by the network device are not limited in embodiments of this application.

An example in which the network device 1 is a base station 1 and the network device 2 is a base station 2 is used for describing the communication system shown in FIG. 1. In FIG. 1, the base station 1 and the base station 2 are neighboring base stations to each other. There is a direct communication interface between the base station 1 and the base station 2. The base station 1 and the base station 2 may exchange information through the communication interface, for example, send resource usage of the base station 1 and the base station 2 to each other. Cell handover may occur when the terminal 1 or the terminal 2 moves. For example, the terminal 1 is handed over from the cell 1 to the cell 2, or the terminal 2 is handed over from the cell 2 to the cell 1. The base station 1 and the base station 2 may be connected to a same core network, or may be connected to different core networks, and the core networks may communicate with each other.

In a drone terminal communication scenario, the terminal 1 and the terminal 2 are respectively UAVs in a flight state, and the base station 1 and the base station 2 are respectively ground base stations that have a capability of communicating with the UAV, for example, a dedicated base station or a common base station that manages the UAV. The dedicated base station that manages the UAV has a complete communication capability for the UAV in a near-end range and a communication capability for low-rate data and signaling of the UAV in a far-end range. The near-end range and the far-end range may be divided according to whether signal quality in a corresponding space can enable communication quality of the UAV to reach a specific threshold. For example, a space with a geographical radius of 20 km and a space with a space domain radius of 3 km may be considered as the far-end range. In addition, the dedicated base station may also have a function of a common ground base station. The common base station that manages the UAV has the function of the common ground base station and the complete communication capability for the UAV in the near-end range, and the common base station may further serve as a data plane relay node of a UAV located at a high altitude. Because a serving cell and a neighboring cell relationship of the UAV in the air are different from a serving cell and a neighboring cell relationship of a common ground terminal, in a movement process of the UAV, a time point at which the UAV switches a serving cell and a determined target cell may be different from those of the common ground terminal. How to select a proper target base station and a proper target cell for the UAV is a problem to be urgently resolved.

As an example (Manner 1) of a handover manner, handover of the terminal is controlled by a network device currently accessed by the terminal or a network device currently providing a service (referred to as a "source base station" for short). A handover procedure includes: The source base station may indicate the terminal to perform cell measurement, determine, based on a measurement report reported by the terminal, whether to hand over a serving cell of the terminal, and if determining to hand over, send a handover request message to a target network device (referred to as a "target base station" for short) to which the terminal is to be handed over, and if the target base station allows access of the terminal, the target base station sends a handover confirm message to the source base station. One of determining bases for the source base station to determine whether to hand over the cell on which the terminal camps is a cell handover trigger threshold. If signal quality of a neighboring cell reported by the terminal reaches or exceeds the cell handover trigger threshold, the source base station determines that the terminal can be handed over to the neighboring cell.

Figure 2:
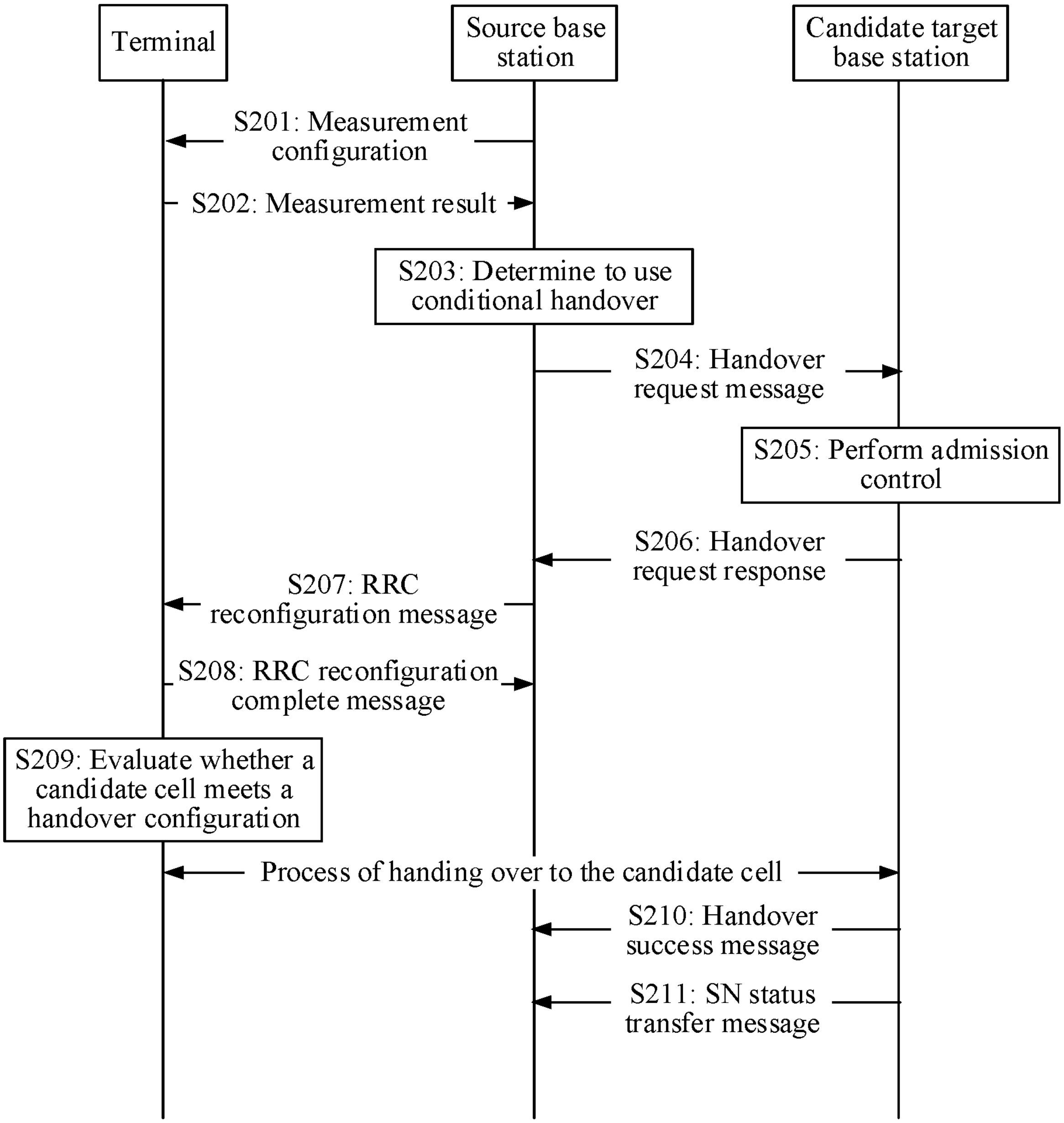
FIG. 2 is a schematic flowchart of conditional handover according to an embodiment of this application.

As an example (Manner 2) of another handover manner, to reduce system overheads and improve handover efficiency, a conditional handover (CHO) manner is proposed. The conditional handover means that the terminal performs handover when some CHO conditions are met. Specifically, the terminal may determine, from candidate target cells provided by a network side, to select a candidate target cell that meets the CHO condition, and perform handover. For example, FIG. 2 is a flowchart of conditional handover, including the following steps.

S201: A source base station sends a measurement configuration to a terminal.

S202: The terminal measures a serving cell and a neighboring cell based on the measurement configuration, and reports a cell measurement result to the source base station.

S203: The source base station determines to use conditional handover.

S204: The source base station sends a handover request message to one or more candidate target base stations.

Generally, the source base station separately sends the handover request message to each neighboring base station. In other words, all neighboring base stations of the source base station may be used as the candidate target base stations.

S205: The candidate target base station performs admission control.

Specifically, the candidate target base station may determine and control, based on a current load level, whether to allow the terminal to access a network. In addition, each candidate target base station manages one or more cells, and the candidate target base station may determine a cell with good signal quality as a candidate cell, and provide the candidate cell for the terminal to make a CHO decision.

S206: The candidate target base station sends a handover request response including a candidate cell configuration to the source base station.

S207: The source base station sends a radio resource control (RRC) reconfiguration (reconfiguration) message to the terminal. The RRC reconfiguration message includes the candidate cell configuration and a handover condition.

The configuration and the handover condition of the candidate cell may be referred to as a CHO configuration of the candidate cell. It may be understood that the handover condition corresponds to the candidate cell, and handover conditions of different candidate cells may be the same or may be different.

The handover condition may also be referred to as a CHO condition, a CHO execution condition, a handover trigger condition, or the like. For example, the handover condition may include information such as target candidate cell indication information, a candidate special cell (SpCell) configuration list added or modified for CHO, or a candidate SpCell configuration list to be deleted. If the handover condition includes the target candidate cell indication information, it indicates that the candidate cell provided by the candidate target base station may be used as a target candidate cell, and the terminal may perform conditional reconfiguration on the target candidate cell.

The configuration of the candidate cell may include information such as an identifier of the candidate cell, a system information block 1 (SIB1) of the candidate cell, or a radio bearer configuration.

S208: The terminal sends an RRC reconfiguration complete message to the source base station.

S209: The terminal evaluates whether the candidate cell meets the handover condition.

Specifically, after receiving the CHO configuration of the candidate cell, the terminal starts to evaluate whether the candidate cell meets the handover condition. When the terminal determines that a candidate cell meets a corresponding handover condition, or the terminal selects a candidate cell from a plurality of candidate cells that meet a corresponding handover condition based on conditions such as cell signal quality, the terminal performs a procedure of handing over to the candidate cell, and stops evaluating the handover condition after performing handover. The procedure of handing over the terminal to the candidate cell includes: detaching from the source base station, executing an action of applying stored corresponding configuration by the selected candidate cell, synchronizing to the candidate cell, and sending the RRC reconfiguration complete message to the target base station, to complete an RRC handover process. After successfully completing the RRC handover procedure, the terminal may release the stored CHO configuration.

S210: The target base station sends a handover success message to the source base station, to notify the terminal that the terminal successfully accesses the target cell.

S211: The source base station sends an SN status transfer message to the target base station.

Optionally, the source base station sends a handover cancel message to a candidate target base station other than the target base station.

Regardless of which handover manner is used, when a target base station to which the terminal is handed over is determined, only a condition related to the cell signal quality is considered. For a terminal such as a UAV, a selected target base station may not be suitable for terminal access. Further, if the CHO is used, the source base station sends a handover request to each neighboring base station. After the terminal performs handover of the target base station, resources of other candidate target base stations that prepare the resources for the terminal are wasted, resulting in unnecessary overheads of system resources.

To improve a handover effect and communication quality, and save the system resources, this application provides a handover method. The following describes in detail the handover method provided in this application with reference to FIG. 3 to FIG. 8. The method provided in this application may be performed by a terminal or a network device, or may be performed by a communication apparatus, for example, a chip, used for a terminal or a network device. The method provided in this application may be applied to the communication system shown in FIG. 1. The following describes the handover method provided in this application by using a terminal as UE and a network device as a base station.

Figure 3:
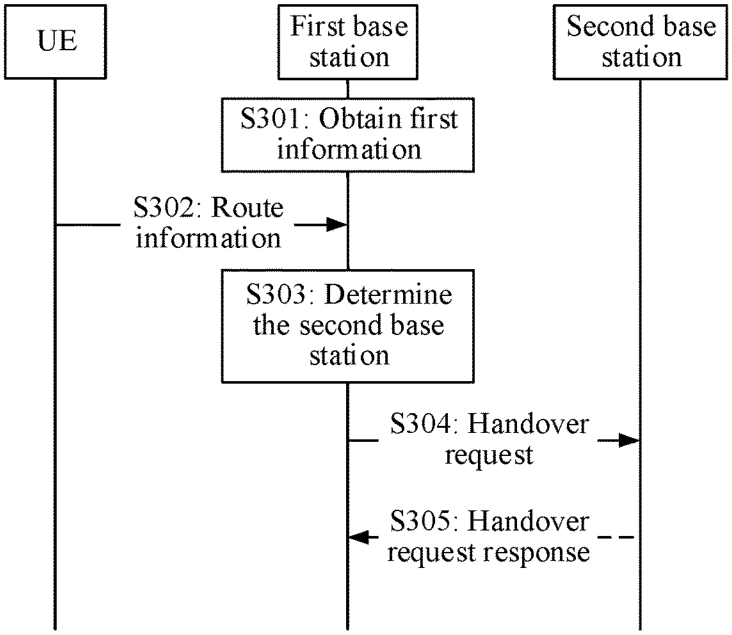
FIG. 3 is a flowchart of a handover method according to an embodiment of this application.

FIG. 3 is a schematic flowchart of a handover method according to this application. The method includes the following steps.

S301: A first base station obtains first information, where the first information includes coverage information of at least one base station adjacent to the first base station.

The first base station is a base station currently accessed by UE, and may also be referred to as a serving base station of the UE. In a handover scenario, the first base station may also be referred to as a source base station. In addition, for ease of description, the base station adjacent to the first base station is referred to as a neighboring base station for short in the following, and the neighboring base station of the first base station may be used as a candidate target base station to which the UE is to be handed over. One or more cells managed by each candidate target base station may be used as a candidate target cell to which the UE is to be handed over.

Optionally, the candidate target cell is a dedicated cell of the UE. For example, when the UE is a UAV, the candidate target cell is a UAV-dedicated cell or a high-altitude cell. The high-altitude cell is a cell whose signal transmission direction points to the air.

Optionally, coverage information of each neighboring base station includes location information of the neighboring base station, and/or coverage range information of a cell managed by the neighboring base station.

The location information of the neighboring base station may include geographical location information of the neighboring base station, and the geographical location information may be longitude and latitude of a geographical location of the neighboring base station.

Figure 4:
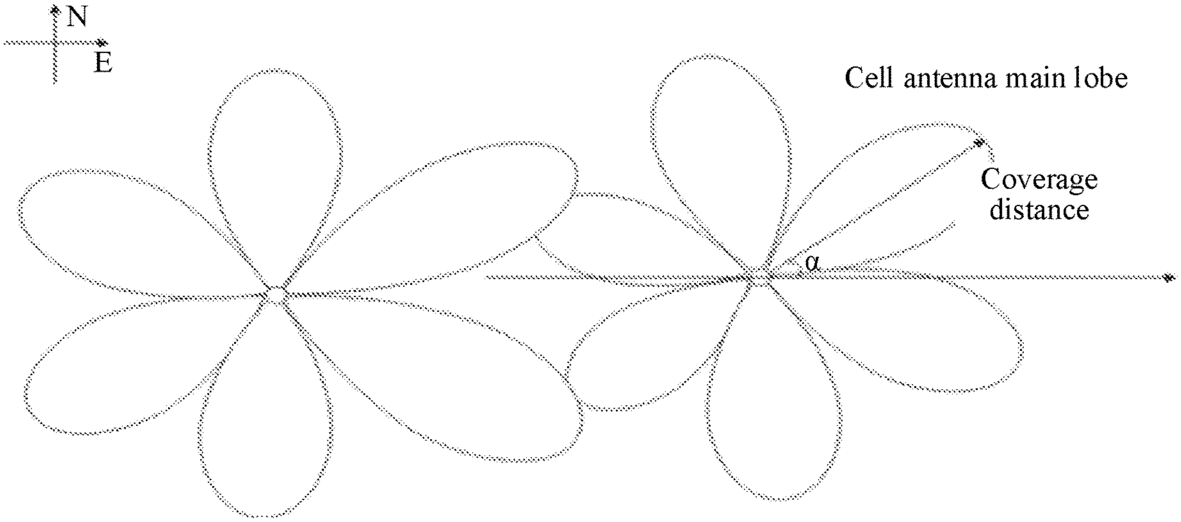
FIG. 4 is a schematic diagram of a cell direction according to an embodiment of this application.
Figure 5:
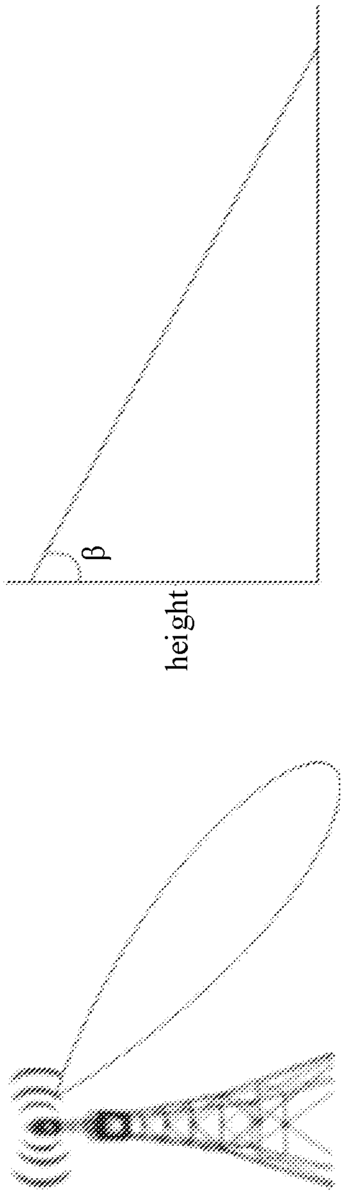
FIG. 5 is a schematic diagram of a pitch angle of a base station antenna according to an embodiment of this application.

Optionally, the coverage range information of the cell includes direction information of the cell. In this application, an included angle between the cell and a specified reference direction may be defined as a cell direction. As shown in FIG. 4, a is defined as an included angle between a direction of a cell antenna main lobe and a due east direction. Optionally, the coverage range information of the cell may further include a length and a width of a coverage range of the cell. Optionally, the coverage range information of the cell further includes indication information indicating whether the cell is the high-altitude cell. A possible manner of the indication information is to use a 1-bit indication bit. For example, when a value of the indication bit is "0", it indicates that the cell is not the high-altitude cell. When a value of the indication bit is "1", it indicates that the cell is the high-altitude cell. Optionally, the coverage range information of the cell further includes information such as a height of a base station to which the cell belongs and/or a pitch angle β of a base station antenna, as shown in FIG. 5. When the coverage range information of the cell includes a plurality of types of information, a location and the coverage range of the cell can be more accurately reflected. In an implementation, the first information further includes coverage information of the first base station. Optionally, the coverage information of the first base station includes location information of the first base station, and/or coverage range information of a cell managed by the first base station.

Details are not described again. The first base station may accurately locate a boundary between a coverage range of the first base station and a coverage range of the neighboring base station based on the coverage information of the first base station and the coverage information of the neighboring base station.

Optionally, in an implementation of this application, the first base station receives the first information from OAM.

For example, in this implementation, the OAM may obtain location information of each base station within a management range of the OAM by using a global positioning system (GPS) or the like. In addition, the OAM may pre-configure coverage range information of a cell managed by each base station for each base station within the management range. The location information of the base station and the coverage range information of the cell may form coverage information of the base station, so that the OAM can send the coverage information of the first base station and the neighboring base station to the first base station. It may be understood that, the OAM can send the coverage information of the base station and the neighboring base station to any base station within the management range of the OAM.

Optionally, in an implementation of this application, the first base station receives the coverage information of the first base station from the OAM, and separately receives the coverage information of the neighboring base station from each neighboring base station.

Specifically, in this implementation, the OAM separately sends the coverage information of the base station to any base station within the management range of the OAM. In other words, each base station obtains coverage information of the base station from the OAM, and then base stations may exchange the coverage information. For example, the first base station separately obtains the coverage information of the neighboring base station from each neighboring base station. In addition, the first base station may also send the coverage information of the first base station to each neighboring base station. The coverage information of each base station may be transmitted by using an interface message between the base stations, or may be forwarded via a core network. This is not limited in this application.

Optionally, in an implementation of this application, if coverage information of a base station changes, the OAM may notify the base station of a change of the coverage information of the base station, including notifying information such as changed coverage information or coverage information that changes and a changed range. Then, the base station may notify each neighboring base station of updated coverage information, and the neighboring base station that receives the updated coverage information may send a confirm message to the base station. For example, the first base station may receive updated coverage information of the first base station from the OAM, and send the updated coverage information of the first base station to each neighboring base station. Similarly, the first base station may separately receive updated coverage information of each neighboring base station from each neighboring base station. Optionally, the first base station may send a configuration update message to the neighboring base station, where the configuration update message includes the updated coverage information of the neighboring base station.

Optionally, in an implementation of this application, if coverage information of a plurality of neighboring base stations changes within a time period, the OAM may separately notify each base station in the plurality of neighboring base stations of changes of the coverage information of the neighboring base stations.

Optionally, the first base station may establish and maintain a neighbor relationship list based on the obtained first information, and record and update the coverage information of the first base station and each neighboring base station in the list.

S302: The first base station receives route information from the UE.

The route information of the UE may indicate a moving path of the UE. Specifically, the route information may include a path point (waypoint) that the UE passes through in a movement process, and the path point may be represented by using longitude and latitude of a geographical location of the path point. The route information may further include timestamp information, and the timestamp information indicates time at which each path point is passed. Optionally, the route information further includes a maximum quantity of path points and an indication indicating whether to report the timestamp information. When the UE is the UAV, the route information may include a flight path (flight path) of the UAV.

The first base station may not only learn of, based on the route information of the UE, a route that the UE has passed through, but also pre-determine a range that the UE is to pass through, in other words, pre-determine a future moving path of the UE.

Optionally, the first base station may send a route request to the UE, and the UE sends a route request response to the first base station based on the route request, where the route request response includes the route information of the UE.

It may be understood that a sequence of performing steps S301 and S302 is not limited in this application. S301 may be performed before S302, S302 may be performed before S301, or S301 and S302 are performed simultaneously.

S303: The first base station determines a second base station in the at least one neighboring base station based on the first information and the route information.

Specifically, the first base station determines, in the at least one neighboring base station, the second base station that can provide a communication service for the UE. If handover is performed in Manner 1, the first base station determines that the second base station is used as a target base station to which the terminal is to be handed over. If handover is performed in Manner 2, the first base station determines that the second base station is used as a candidate target base station or one of candidate target base stations to which the terminal is to be handed over.

Optionally, in an implementation of this application, the first base station determines the moving path of the UE based on the route information, and determines a coverage range of the at least one neighboring base station based on the coverage information of the at least one neighboring base station, so that the first base station determines a neighboring base station whose coverage range overlaps the moving path of the UE as the second base station. That is, the first base station determines, based on the moving path of the UE, the UE is to pass through a coverage range of the second base station, so that the first base station determines that the second base station can provide a communication service for the UE.

For example, when the UE is the UAV, the first base station may obtain the flight path of the UAV based on the route information reported by the UAV, calculate a coverage range of a cell managed by a neighboring base station that overlaps the flight path of the UAV, and select a base station to which a cell whose coverage range overlaps the flight path of the UAV belongs as the second base station.

Optionally, in an implementation of this application, the first base station determines a moving direction of the UE based on the route information, determines, based on the coverage information of the at least one neighboring base station, one or more candidate neighboring base stations in the moving direction of the UE, and determines the second base station in the candidate neighboring base stations. In this implementation, the first base station first excludes a neighboring base station that is not in the moving direction of the UE, and uses only a neighboring base station in the moving direction of the UE as a candidate base station, and then determines, based on coverage information of the candidate base station, a candidate neighboring base station whose coverage range overlaps the moving path of the UE as the second base station. In this implementation, the first base station does not need to analyze coverage information of all neighboring base stations, so that system resources are saved and processing efficiency is improved.

For example, when the UE is the UAV, the first base station may calculate a flight direction of the UAV based on the route information reported by the UAV. For example, the UAV flies in a southeast direction. The first base station determines, based on the coverage information of each neighboring base station in the maintained neighbor relationship list, a neighboring base station that may provide a communication service for the UAV in the southeast direction. In other words, the neighboring base station in the southeast direction is used as a candidate neighboring base station, and the second base station is determined in the candidate neighboring base station.

Optionally, in an implementation of this application, the first base station determines the moving direction of the UE based on the route information, and determines, based on the coverage information of the at least one neighboring base station, the one or more candidate neighboring base stations in the moving direction of the UE. Further, the first base station separately sends a handover request to the candidate neighboring base stations. If a candidate neighboring base station determines that the candidate neighboring base station can provide a communication service for the UE, the candidate neighboring base station sends a request response to the first base station. For example, a first candidate neighboring base station receives the handover request of the first base station, and determines, based on the coverage information, that the moving path of the UE overlaps a coverage range of the first candidate neighboring base station. In this case, the first candidate neighboring base station determines that the first candidate neighboring base station can provide a communication service for the UE, and then sends a handover request response to the first base station.

Optionally, when determining the second base station, the first base station not only considers whether a location of the neighboring base station and a cell coverage range meet the moving path of the UE, but also considers whether signal quality of the neighboring base station reaches a preset threshold, and uses, as the second base station, a neighboring base station whose signal quality reaches or exceeds the preset threshold and that meets the moving path of the UE. The first base station may receive a cell measurement report from the UE, where the cell measurement report includes results of measuring a signal of a serving cell and a signal of each neighboring cell by the UE. S304: The first base station sends a handover request to the second base station, where the handover request is used for requesting to hand over the terminal from the first base station to the second base station.

Optionally, in an implementation, the method further includes S305: The first base station receives a handover request response from the second base station.

The handover request response may include a related configuration of the second base station, for example, RRC reconfiguration information of the second base station, where the RRC reconfiguration information used by the UE to access the second base station. When a CHO manner is used, the related configuration of the second base station may include information about a candidate cell managed by the second base station and a CHO condition corresponding to the candidate cell.

Optionally, the handover request response includes indication information, and the indication information indicates a possibility that the second base station provides a communication service for the UE. Optionally, the indication information is any value in integers ranging from 0 to N ($N \geq 1$), and represents a probability that the second base station can provide a communication service for the UE. For example, N=100. That a value of the indication information is 0 indicates that the second base station cannot provide a communication service for the UE. That a value of the indication information is 50 indicates that the probability that the second base station can provide a communication service for the UE is 50%. That a value of the indication information is 100 indicates that the probability that the second base station can provide a communication service for the UE is 100%. For another example, N=4. That a value of the indication information is 0 indicates that the second base station cannot provide a communication service for the UE. That a value of the indication information is 1 indicates that the probability that the second base station can provide a communication service for the UE is 25%. That a value of the indication information is 2 indicates that the probability that the second base station can provide a communication service for the UE is 50%. That a value of the indication information is 3 indicates that the probability that the second base station can provide a communication service for the UE is 75%. That a value of the indication information is 4 indicates that the probability that the second base station can provide a communication service for the UE is 100%.

Optionally, in an implementation, if the first base station does not receive the handover request response from the second base station after preset time, it indicates that the handover request fails. The first base station may initiate a handover request to the second base station again, or initiate a handover request to another candidate target base station.

When the first base station receives the handover request response from the second base station, and the CHO manner is used, the method further includes: The first base station sends a CHO configuration to the UE, where the CHO configuration includes information about at least one candidate cell, and a condition that is met by the UE for determining to be handed over to any candidate cell in the at least one candidate cell, and a part or all of the at least one candidate cell are managed by the second base station.

The condition that is met by the UE for determining to be handed over to any candidate cell is a CHO condition corresponding to the candidate cell.

It may be understood that the first base station may determine a plurality of candidate target base stations. In other words, in addition to the second base station, the first base station may further determine one or more candidate target base stations, and separately send the handover request to the candidate target base stations. Therefore, the first base station may separately receive handover request responses from the plurality of candidate target base stations, and a handover request response sent by each candidate target base station may include information about a candidate cell managed by the candidate target base station and a CHO condition corresponding to the candidate cell. Therefore, the CHO configuration sent by the first base station to the UE may include information about a plurality of candidate cells that separately belong to the second base station and the another candidate target base station, and a CHO condition corresponding to each candidate cell. After receiving the conditional handover configuration, the UE may select, from the plurality of candidate cells, a candidate cell that meets the CHO condition to perform handover. For specific descriptions of CHO, refer to the foregoing related content, for example, the descriptions in FIG. 2.

According to the handover method provided in this application, the first base station determines, based on the coverage information of the neighboring base station and the route information of the UE, the second base station that can provide a communication service for the UE, and sends a handover request message to the second base station. Adaptation between the moving path of the UE and the coverage range of the neighboring base station is considered in a process of determining the target base station or the candidate target base station, so that the UE can be handed over to a base station that matches the moving path of the UE. This improves a handover effect and communication quality.

Figure 6:
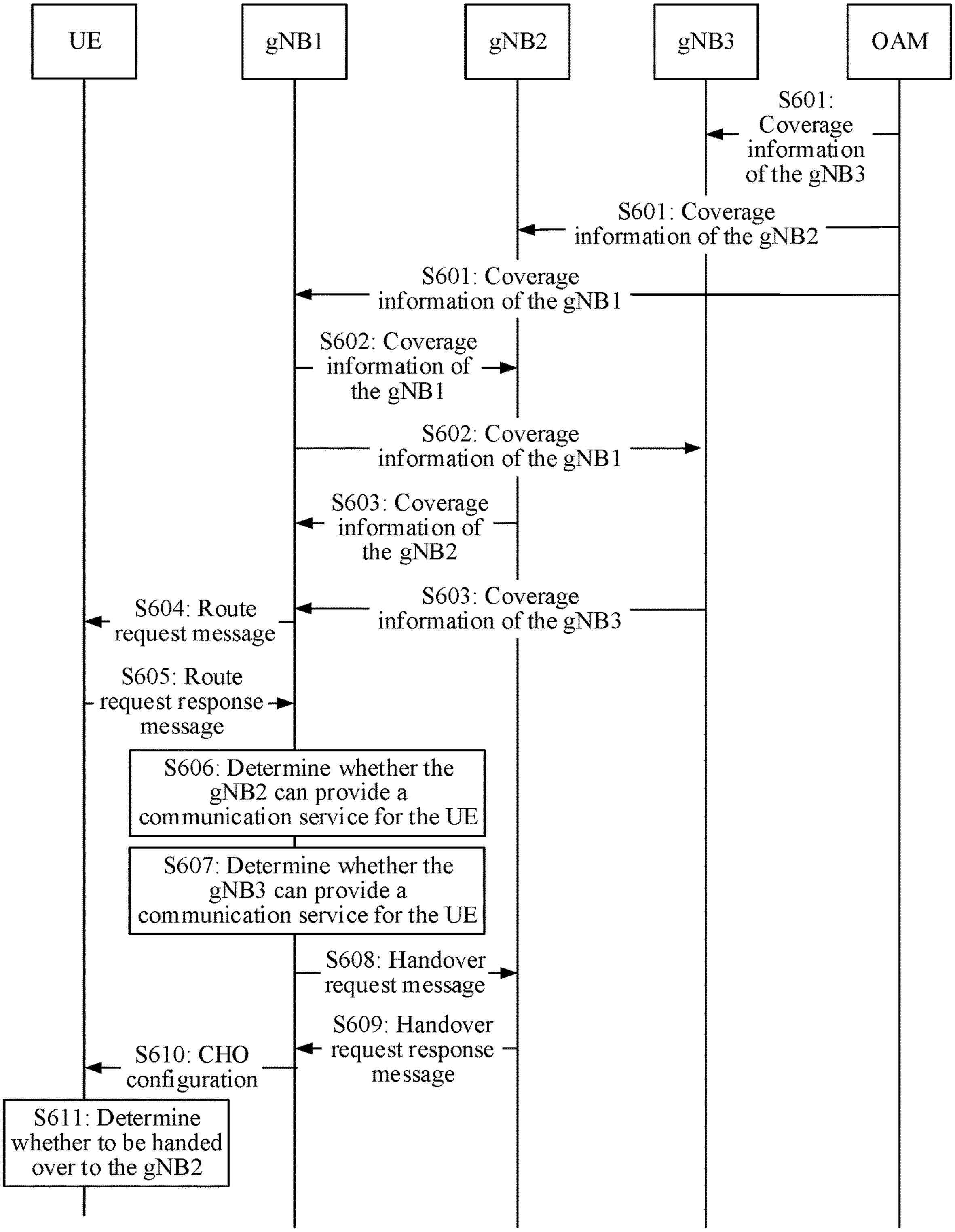
FIG. 6 is a flowchart of a handover method according to an embodiment of this application.

The following embodiment shown in FIG. 6 further explains and describes the handover method provided in this application based on the embodiment shown in FIG. 3. Content that has been described is not described again. In the embodiment shown in FIG. 6, the first access network device is a gNB1, and a gNB2 and a gNB3 are neighboring base stations of the gNB1. It is assumed that the UE is handed over in the CHO manner, the gNB1 is a source base station, and the gNB2 and the gNB3 are candidate target base stations.

S601: The OAM separately configures coverage information of the gNB1 for the gNB1, configures coverage information of the gNB2 for the gNB2, and configures coverage information of the gNB3 for the gNB3.

S602: The gNB1 separately sends the coverage information of the gNB1 to the gNB2 and the gNB3.

Optionally, the coverage information of the gNB1 is included in Xn interface setup request (Xn setup request) messages sent by the gNB1 to the gNB2 and the gNB3 respectively.

S603: The gNB1 receives the coverage information of the gNB2 from the gNB2, and receives the coverage information of the gNB3 from the gNB3.

Optionally, the coverage information of the gNB2 and the coverage information of the gNB3 are included in Xn interface setup response (Xn setup response) messages respectively sent by the gNB2 and the gNB3 to the gNB1.

The gNB1 may further receive coverage information from one or more neighboring base stations other than the gNB2 and the gNB3. This is not shown in FIG. 6. The gNB1 may establish and maintain a neighbor relationship list based on the received coverage information of each neighboring base station.

S601 to S603 are optional. In another implementation, S601 to S603 may be replaced with step S601', and S601' includes: The OAM sends the coverage information of the gNB1, the coverage information of the gNB2, and the coverage information of the gNB3 to the gNB1.

S604: The gNB1 sends a route request message to the UE.

S605: The UE sends a route request response message to the gNB1, where the route request response message includes the route information of the UE.

It may be understood that a sequence of performing S601 to S605 is merely an example, and there is no limitation on a sequence of performing S601 to S603 and S604 and S605. For example, the gNB1 first obtains the coverage information of the gNB1 and the coverage information of the neighboring base stations, and then obtains the route information of the UE. Alternatively, the gNB1 first obtains the route information of the UE, and then obtains the coverage information of the gNB1 and the coverage information of the neighboring base stations. This is not limited in this application.

S606: The gNB1 determines, based on the route information of the UE and the coverage information of the gNB2, whether the gNB2 can provide a communication service for the UE.

S607: The gNB1 determines, based on the route information of the UE and the coverage information of the gNB3, whether the gNB3 can provide a communication service for the UE.

It is assumed that the gNB1 determines that a coverage range of the gNB2 overlaps a moving path of the UE, and determines that the UE is not to pass through a coverage range of the gNB3. Therefore, the gNB1 determines that the gNB2 can provide a communication service for the UE, and the gNB3 cannot provide a communication service for the UE.

It may be understood that a sequence of performing S606 and S607 is not limited in this application. S606 may be performed before S607, S607 may be performed before S606, or S606 and S607 may be performed simultaneously.

For detailed descriptions of S606 and S607, refer to related content in step S303 in the foregoing embodiment. Details are not described again.

S608: The gNB1 sends a handover request message to the gNB2.

S609: The gNB2 sends a handover request response message to the gNB1.

The handover request response message includes information about a candidate cell of the gNB2 and a CHO condition corresponding to the candidate cell.

S610: The gNB1 sends a CHO configuration to the UE.

The CHO configuration includes information about one or more candidate cells and a CHO condition corresponding to each candidate cell, and the one or more candidate cells include the candidate cell of the gNB2.

S611: The UE determines, based on the CHO configuration, whether to be handed over to the gNB2.

If the UE determines, based on the CHO configuration, that the UE can be handed over to the gNB2, a procedure of handing over to the gNB2 is performed. Details are not described.

According to the foregoing handover method, the gNB1 does not need to send the handover request message to each of the gNB2 and the gNB3, and only needs to pre-determine that the gNB2 can provide a communication service for the UE, and the gNB3 cannot provide a communication service for the UE, so that the gNB1 sends the handover request message to the gNB2, and the gNB3 does not need to prepare transmission resources for the UE. Therefore, the CHO configuration sent by the gNB1 to the UE is optimized, overall system resources are saved, and handover efficiency is improved.

Figure 7:
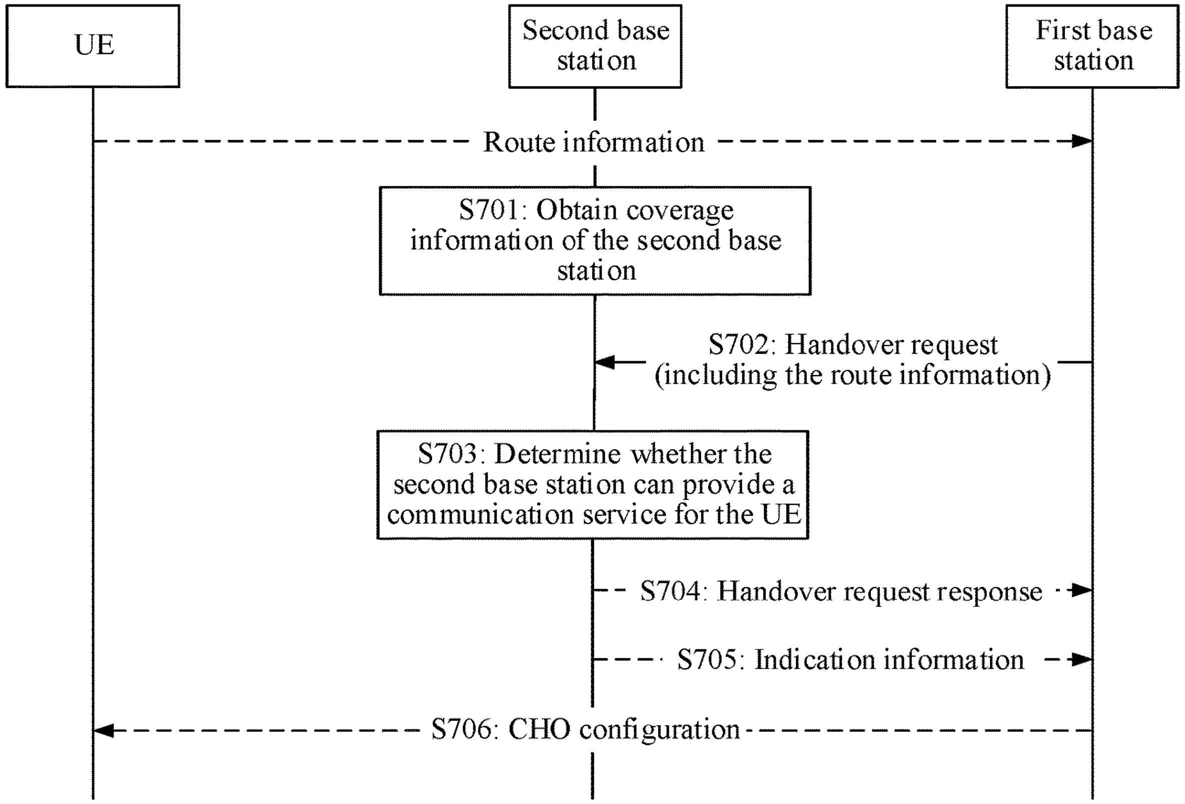
FIG. 7 is a flowchart of a handover method according to an embodiment of this application.

FIG. 7 is a schematic flowchart of another handover method according to this application. In this embodiment, a neighboring base station of a source base station determines whether to serve as a target base station or a candidate target base station to which UE is to be handed over. The method includes the following steps.

S701: A second base station obtains coverage information of the second base station.

The coverage information of the second base station includes location information of the second base station, and/or coverage range information of a cell managed by the second base station. For detailed descriptions of the coverage information of the second base station, refer to related content in the foregoing embodiment.

Optionally, the second base station receives the coverage information from OAM.

Optionally, the second base station receives the coverage information from another base station, for example, a first base station. In this implementation, the OAM may send coverage information of a base station and a neighboring base station to the base station, so that the base station may send the coverage information of the neighboring base station to the neighboring base station.

The first base station and the second base station are neighboring base stations to each other. The first base station is the source base station in a handover process of UE, and the second base station is the candidate target base station in the handover process of the UE. For descriptions of meanings of the first base station and the second base station, refer to related content in the foregoing embodiment.

S702: The second base station receives a handover request from the first base station, where the handover request includes route information of the UE, and the handover request requests to hand over a terminal from the first base station to the second base station.

Optionally, the first base station may receive the route information from the UE. For example, the first base station sends a route information request message to the UE, so that the UE adds the route information to a route request response message.

Optionally, the UE is a UAV, and the route information includes a flight path of the UAV. For specific descriptions of the route information, refer to related content in the foregoing embodiment.

Optionally, the first base station may determine, based on a cell measurement result reported by the UE, that signal quality of the second base station reaches or exceeds a preset threshold, so that the first base station sends the handover request to the second base station.

It may be understood that a sequence of performing steps S701 and S702 is not limited in this application. S701 may be performed before S702, or S702 may be performed before S701, or S701 and S702 are performed simultaneously.

S703: The second base station determines, based on the coverage information and the route information, whether the second base station can provide a communication service for the UE.

Optionally, in an implementation, the second base station determines a coverage range of the second base station based on the coverage information, and determines, based on the route information, whether a moving path of the UE is to overlap the coverage range of the second base station.

Optionally, in an implementation, the second base station determines a moving direction of the UE based on the route information, and determines, based on the coverage information, whether the second base station is located in the moving direction of the UE. When the second base station determines that the second base station is not in the moving direction of the UE, it indicates that the second base station cannot provide a communication service for the UE, and the second base station does not need to determine whether the coverage range of the second base station overlaps the moving path of the UE. When the second base station determines that the second base station is in the moving direction of the UE, the second base station determines whether the coverage range of the second base station overlaps the moving path of the UE. If the coverage range of the second base station overlaps the moving path of the UE, the second base station can provide a communication service for the UE.

For detailed descriptions of S703, refer to the foregoing embodiment, for example, the descriptions of step S303. Details are not described again.

S704: When the second base station determines that the second base station can provide a communication service for the UE, the second base station sends a handover request response to the first base station.

Optionally, the handover request response includes indication information, and the indication information indicates a possibility that a second access network device provides a communication service for the terminal. For detailed descriptions of the indication information, refer to related content in the foregoing embodiment.

Optionally, in an implementation of this application, the method further includes S705: When determining that the second base station cannot provide a communication service for the UE, the second base station sends, to the first base station, indication information indicating that the second base station cannot provide a communication service for the terminal.

Optionally, the indication information reuses a cause value in an existing message, for example, a cause value "No Radio Resources Available in Target Cell" or a cause value "Cell not Available" in a handover preparation failure (handover preparation failure) message. Optionally, the indication information is a newly designed cause value. For example, the cause value indicates that the moving path of the UE does not match the coverage range of the second base station.

Optionally, in another implementation, when the second base station determines that the second base station cannot provide a communication service for the UE, the second base station does not send the indication information to the first base station. When the first base station does not receive the indication information within preset time, it indicates that the second base station cannot provide a communication service for the UE. Specifically, a timer may be set in the first base station. When the timer expires, the first base station confirms that the second base station cannot provide a communication service for the UE.

Optionally, if a CHO handover manner is used, the method further includes S706: The first base station sends a CHO configuration to the terminal, where the CHO configuration includes information about at least one candidate cell, and a condition that is met by the UE for determining to be handed over to any candidate cell in the at least one candidate cell, and a part or all of the at least one candidate cell are managed by the second base station. When the UE determines, based on the CHO configuration, to be handed over to a first candidate cell managed by the second base station, the second base station performs time synchronization with the terminal.

For specific descriptions of CHO, refer to the foregoing related content, for example, the descriptions in FIG. 2.

According to the handover method provided in this application, the second base station receives, from the first base station, the handover request that includes the route information of the UE, so that the second base station determines, based on the route information of the UE and the coverage information of the second base station, whether the second base station can provide a communication service for the UE. When determining that the second base station can provide a communication service for the UE, the second base station sends the handover request response to the first base station, so that the UE can be handed over to a base station whose coverage range matches the moving path of the UE. This improves a handover effect and communication quality.

Figure 8:
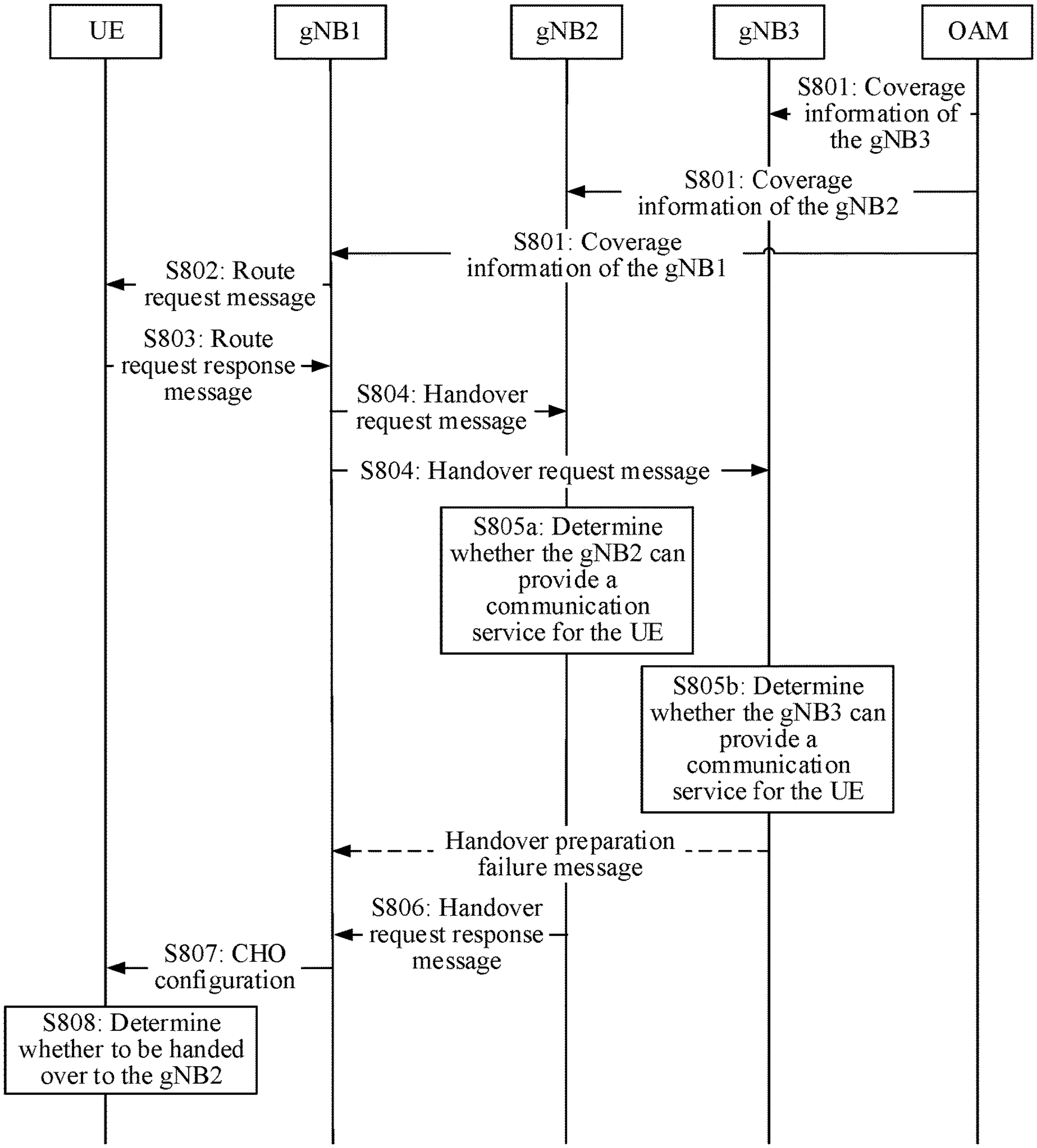
FIG. 8 is a flowchart of a handover method according to an embodiment of this application.

The following embodiment shown in FIG. 8 further explains and describes the handover method provided in this application based on the embodiment shown in FIG. 7. Content that has been described is not described again. In the embodiment shown in FIG. 8, a first access network device is a gNB1, and a gNB2 and a gNB3 are neighboring base stations of the gNB1. It is assumed that the UE is handed over in the CHO manner, the gNB1 is the source base station, and the gNB2 and the gNB3 are candidate target base stations.

S801: The OAM separately configures coverage information of the gNB1 for the gNB1, configures coverage information of the gNB2 for the gNB2, and configures coverage information of the gNB3 for the gNB3.

S802: The gNB1 sends a route request message to the UE.

S803: The UE sends a route request response message to the gNB1, where the route request response message includes the route information of the UE.

It may be understood that a sequence of performing S801, and S802 and S803 is not particularly limited in this application. For example, S801 may be performed before S802 and S803, or S802 and S803 may be performed before S801.

S804: The gNB1 separately sends a handover request message to the gNB2 and the gNB3, where the handover request message includes the route information of the UE.

S805*a*: The gNB2 determines, based on the coverage information of the gNB2 and the route information of the UE, whether the gNB2 can provide a communication service for the UE.

S805*b*: The gNB3 determines, based on the coverage information of the gNB3 and the route information of the UE, whether the gNB3 can provide a communication service for the UE.

It may be understood that a sequence of performing S805*a* and S805*b* is not particularly limited in this application.

It is assumed that the gNB2 determines that the gNB2 can provide a communication service for the UE, and the gNB3 determines that the gNB3 cannot provide a communication service for the UE. The method further includes S806: The gNB2 sends a handover request response message to the gNB1.

The handover request response message includes information about a candidate cell of the gNB2 and a CHO condition corresponding to the candidate cell.

Optionally, the gNB3 may send a handover preparation failure (handover preparation failure) message to the gNB1, to notify the gNB1 that the gNB3 cannot serve as a target base station to which the UE is to be handed over.

S807: The gNB1 sends a CHO configuration to the UE.

S808: The UE determines, based on the CHO configuration, whether to be handed over to the gNB2.

For steps S806 to S808, refer to related content in the foregoing embodiment, for example, the descriptions of steps S609 to S611.

According to the foregoing handover method, the gNB2 and the gNB3 are used as the neighboring base stations of the gNB1, and separately determine whether the gNB2 and the gNB3 can provide a communication service for the UE. The gNB2 determines that the gNB2 can provide a communication service for the UE, and sends, to the gNB1, a handover request response including a CHO configuration corresponding to the gNB2. However, the gNB3 determines that the gNB3 cannot provide a communication service for the UE, so that the gNB3 does not need to prepare transmission resources for the UE. Therefore, the CHO configuration sent by the gNB1 to the UE is optimized, overall system resources are saved, and handover efficiency is improved.

Figure 9:
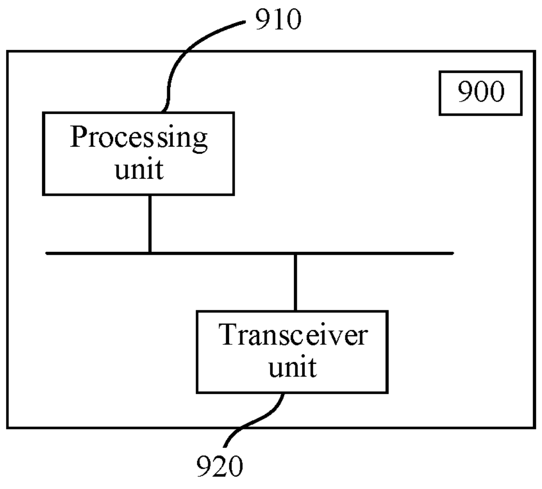
FIG. 9 is a schematic diagram of a communication apparatus 900 according to an embodiment of this application.

An embodiment of this application further provides a communication apparatus configured to implement any one of the foregoing methods. For example, a communication apparatus is provided, and the communication apparatus includes units (or means) configured to implement the steps performed by the terminal or the access network device in any one of the foregoing methods. For example, FIG. 9 is a schematic diagram of a communication apparatus according to an embodiment of this application. The communication apparatus may be a module, for example, a chip, used for a terminal or an access network device. Alternatively, the communication apparatus is a terminal or an access network device. As shown in FIG. 9, the communication apparatus 900 includes a processing unit 910 and a transceiver unit 920.

In an implementation, when the communication apparatus is used for the access network device, the access network device may be used as a source base station in a terminal handover process. The transceiver unit 920 is configured to: obtain first information, where the first information includes coverage information of at least one access network device adjacent to the access network device; and receive route information from a terminal. The processing unit 910 is configured to determine a second access network device from the at least one access network device based on the first information and the route information. The transceiver unit 920 is further configured to send a handover request to the second access network device, where the handover request is used for requesting to hand over the terminal from the access network device to the second access network device.

Optionally, the transceiver unit 920 is further configured to receive a handover request response from a second access network device.

Optionally, the transceiver unit 920 is further configured to send a conditional handover configuration to the terminal, where the conditional handover configuration includes information about at least one candidate cell, and a condition to be met for determining to hand over the terminal to any candidate cell in the at least one candidate cell, and a part or all of the at least one candidate cell are managed by the second access network device.

Optionally, the transceiver unit 920 is configured to receive the first information from OAM.

Optionally, the transceiver unit 920 is configured to: receive coverage information of the first access network device from the OAM, and separately receive the coverage information of the at least one access network device from the at least one access network device.

Optionally, the processing unit 910 is configured to: determine a moving direction of the terminal based on the route information; determine one or more candidate access network devices in the moving direction of the terminal based on the coverage information of the at least one access network device; and determine the second access network device from the candidate access network devices.

Optionally, the processing unit 910 is configured to: determine a moving path of the terminal based on the route information; determine a coverage range of the at least one access network device based on the coverage information of the at least one access network device; and determine an access network device whose coverage range overlaps the moving path of the terminal as the second access network device.

In an implementation, when the communication apparatus is used for the access network device, the access network device may be used as a target base station or a candidate target base station in a terminal handover process. The transceiver unit 920 is configured to receive a handover request from a first access network device, where the handover request is used for requesting to hand over a terminal from the first access network device to the access network device, the access network device is adjacent to the first access network device, the access network device is determined by the first access network device based on first information and route information of the terminal, and the first information includes coverage information of at least one access network device adjacent to the first access network device.

Optionally, the transceiver unit 920 is further configured to send a handover request response to a first access network device. For more detailed descriptions of functions performed by the units of the communication apparatus on an access network device side in the foregoing implementations, refer to the descriptions of the steps performed by the first base station or the second base station in the method embodiments in FIG. 3 to FIG. 6.

In an implementation, when the communication apparatus is used for the access network device, the access network device may be used as a target base station or a candidate target base station in a UE handover process. The transceiver unit 920 is configured to: obtain coverage information of the access network device, and receive a handover request from a second access network device, where the handover request includes route information of a terminal, and the handover request requests to hand over the terminal from the second access network device to a first access network device. The processing unit 910 is configured to determine, based on the coverage information and the route information, whether the first access network device can provide a communication service for the terminal, and when the first access network device determines that the first access network device can provide a communication service for the terminal, the transceiver unit 920 is further configured to send a handover request response to a second access network device.

Optionally, the processing unit 910 is further configured to: when the terminal determines, based on a conditional handover configuration, to be handed over to a first candidate cell managed by the first access network device, perform time synchronization with the terminal, where the conditional handover configuration includes information about at least one candidate cell, and a condition to be met for determining to hand over the terminal to any candidate cell in the at least one candidate cell, and a part or all of the at least one candidate cell are managed by the first access network device.

Optionally, the transceiver unit 920 is further configured to: when the access network device determines that the access network device cannot provide a communication service for the terminal, send, to the second access network device, indication information indicating that the access network device cannot provide a communication service for the terminal.

Optionally, the transceiver unit 920 is configured to receive the coverage information from OAM.

Optionally, the transceiver unit 920 is further configured to receive updated coverage information from the OAM or the second access network device.

Optionally, the processing unit 910 is configured to: determine a moving direction of the terminal based on the route information, and determine, based on the coverage information, whether the access network device is located in the moving direction of the terminal.

Optionally, the processing unit 910 is configured to: determine a coverage range of the access network device based on the coverage information, and determine, based on the route information, whether the terminal is to pass through the coverage range of the access network device.

In an implementation, when the communication apparatus is used for the access network device, the access network device may be used as a source base station in a terminal handover process. The transceiver unit 920 is configured to send a handover request to a first access network device, where the handover request includes route information of a terminal, and the handover request requests to hand over the terminal from a second access network device to the first access network device; and when the first access network device determines, based on coverage information and the route information, that the first access network device can provide a communication service for the terminal, the transceiver unit 920 is further configured to receive a handover request response from a first access network device.

Optionally, the transceiver unit 920 is further configured to: when the access network device determines that the access network device cannot provide a communication service for the terminal, receive, from the first access network device, indication information indicating that the first access network device cannot provide a communication service for the terminal.

Optionally, the transceiver unit 920 is configured to send the coverage information to the first access network device.

For more detailed descriptions of functions performed by the units of the communication apparatus on an access network device side in the foregoing implementations, refer to the descriptions of the steps performed by the second base station or the first base station in the method embodiments in FIG. 7 and FIG. 8.

In an implementation, when the communication apparatus is used for the terminal, the transceiver unit 920 is configured to send route information to a first access network device, so that the first access network device determines that a second access network device is used as a target base station or a candidate target base station to which the terminal is to be handed over. Optionally, the terminal is a UAV.

For more detailed descriptions of functions performed by the units of the communication apparatus on a terminal side in the foregoing implementations, refer to the descriptions of the steps performed by the UE in the method embodiments in FIG. 3 to FIG. 8.

It should be understood that division of the units in the foregoing apparatus is merely logical function division. During actual implementation, all or some of the units may be integrated into one physical entity, or may be physically separated. For example, the transceiver unit 920 may be divided into a receiving unit and a sending unit. When the communication apparatus 900 is a communication apparatus on an access network side, the transceiver unit 920 may be further divided into a first transceiver unit communicating with a terminal and a second transceiver unit communicating with another network device such as a base station or OAM.

All of the units in the apparatus may be implemented in a form of software invoked by a processing element, or may be implemented in a form of hardware; or some of the units may be implemented in a form of software invoked by a processing element, and some of the units may be implemented in a form of hardware. For example, each unit may be a separately disposed processing element, or may be integrated into a chip of the apparatus for implementation. In addition, each unit may be stored in a memory in a form of a program, and invoked by a processing element of the apparatus to perform a function of the unit. In addition, all or some of the units may be integrated together, or may be independently implemented. The processing element described herein may also be referred to as a processor, and may be an integrated circuit that has a signal processing capability. During implementation, steps in the foregoing methods or the foregoing units may be implemented through a hardware integrated logic circuit in a processor element, or may be implemented in a form of software invoked by a processing element.

In an example, a unit in any one of the foregoing apparatuses may be one or more integrated circuits configured to implement the foregoing method, for example, one or more application-specific integrated circuits (ASICs), one or more microprocessors (DSPs), or one or more field programmable gate arrays (FPGAs), or a combination of at least two of these integrated circuit forms. For another example, when the units in the apparatus may be implemented in a form of scheduling a program by a processing element, the processing element may be a general-purpose processor, for example, a central processing unit (CPU) or another processor that can invoke the program. For still another example, the units may be integrated and implemented in a form of a system-on-a-chip (SoC).

The foregoing unit for receiving (for example, a communication unit) is an interface circuit of the apparatus, and is configured to receive a signal from another apparatus. For example, when the apparatus is implemented in a manner of a chip, the receiving unit is an interface circuit that is of the chip and that is configured to receive the signal from another chip or apparatus. The foregoing unit for sending (for example, the sending unit or a communication unit) is an interface circuit of the apparatus, and is configured to send a signal to another apparatus. For example, when the apparatus is implemented in a manner of a chip, the sending unit is an interface circuit that is of the chip and that is configured to send the signal to another chip or apparatus.

In another implementation, the communication apparatus provided in this embodiment of this application may include at least one processing element and an interface circuit. The at least one processing element is configured to perform any handover method provided in the foregoing method embodiments. The processing element may perform some or all of steps performed by the terminal or the network device in a first manner, to be specific, by invoking a program stored in a storage element; or may perform some or all of steps performed by the terminal or the network device in a second manner, to be specific, by using a hardware integrated logic circuit in a processor element in combination with instructions. It is clear that the processing element may alternatively perform some or all of the steps performed by the terminal or the network device by combining the first manner and the second manner. It may be understood that the interface circuit may be a transceiver or an input/output interface. Optionally, the communication apparatus may further include a memory, configured to: store instructions executed by the foregoing processing element, or store input data required by the processing element to run instructions, or store data generated after the processing element runs instructions.

As described above, the processing element herein may be a general-purpose processor, for example, a CPU, or may be one or more integrated circuits configured to implement the foregoing methods, for example, one or more ASICs, one or more microprocessors DSPs, one or more FPGAs, or a combination of at least two of the integrated circuits. The storage element may be one memory, or may be a general term of a plurality of storage elements.

Figure 10:
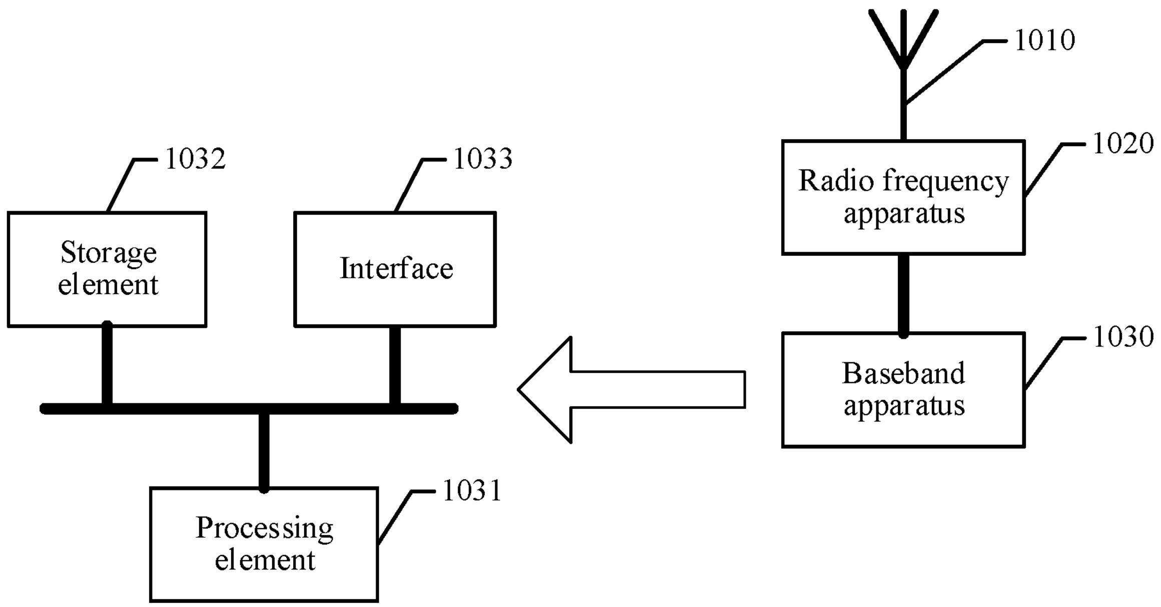
FIG. 10 is a schematic diagram of a network device 1000 according to an embodiment of this application.

FIG. 10 is a schematic diagram of a structure of a network device according to an embodiment of this application. The network device may be an access network device such as a base station, and is configured to perform the handover method provided in the foregoing method embodiments. As shown in FIG. 10, the network device includes an antenna 1010, a radio frequency apparatus 1020, and a baseband apparatus 1030. The antenna 1010 is connected to the radio frequency apparatus 1020. In an uplink direction, the radio frequency apparatus 1020 receives, via the antenna 1010, information sent by a terminal, and sends, to the baseband apparatus 1030, the information sent by the terminal for processing. In a downlink direction, the baseband apparatus 1030 processes the information from the terminal, and sends processed information to the radio frequency apparatus 1020. The radio frequency apparatus 1020 processes the information from the terminal, and then sends processed information to the terminal via the antenna 1010.

The baseband apparatus 1030 may include one or more processing elements 1031, for example, include a main control CPU and another integrated circuit. In addition, the baseband apparatus 1030 may further include a storage element 1032 and an interface 1033. The storage element 1032 is configured to store a program and data. The interface 1033 is configured to exchange information with the radio frequency apparatus 1020, and the interface is, for example, a common public radio interface (CPRI). The foregoing apparatus used for the network device may be located in the baseband apparatus 1030. For example, the foregoing apparatus used for the network device may be a chip in the baseband apparatus 1030. The chip includes at least one processing element and an interface circuit, where the processing element is configured to perform steps performed by the first base station or the second base station in any handover method provided in the foregoing method embodiments, and the interface circuit is configured to communicate with another apparatus. In an implementation, units in the network device for implementing the steps in the foregoing methods may be implemented in a form of scheduling a program by the processing element. For example, the apparatus used for the network device includes a processing element and a storage element. The processing element invokes a program stored in the storage element, to perform the handover method provided in the foregoing method embodiments. The storage element may be a storage element on a same chip as the processing element, namely, an on-chip storage element, or may be a storage element on a different chip from the processing element, namely, an off-chip storage element.

Figure 11:
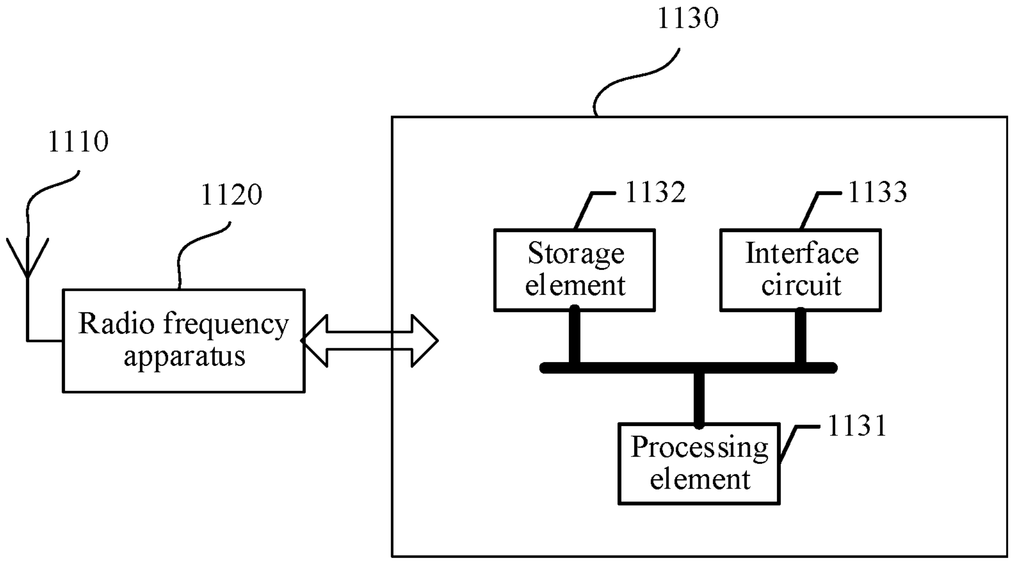
FIG. 11 is a schematic diagram of a terminal 1100 according to an embodiment of this application.

FIG. 11 is a schematic diagram of a structure of a terminal according to an embodiment of this application. The terminal is configured to implement the handover method provided in the foregoing method embodiments. As shown in FIG. 11, the terminal includes an antenna 1110, a radio frequency part 1120, and a signal processing part 1130. The antenna 1110 is connected to the radio frequency part 1120. In a downlink direction, the radio frequency part 1120 receives, via the antenna 1110, information sent by a network device, and sends, to the signal processing part 1130, the information sent by the network device for processing. In an uplink direction, the signal processing part 1130 processes the information from the terminal, and sends processed information to the radio frequency part 1120. The radio frequency part 1120 processes the information from the terminal, and then sends processed information to the network device via the antenna 1110.

The signal processing part 1130 is configured to process each communication protocol layer of data. The signal processing part 1130 may be a subsystem of the terminal. In this way, the terminal may further include another subsystem, for example, a central processing subsystem, configured to process an operating system and an application layer of the terminal. For another example, a peripheral subsystem is configured to connect to another device. The signal processing part 1130 may be a separately disposed chip. Optionally, the foregoing apparatus may be located in the signal processing part 1130.

The signal processing part 1130 may include one or more processing elements 1131, for example, include a main control CPU and another integrated circuit. In addition, the signal processing part 1130 may further include a storage element 1132 and an interface circuit 1133. The storage element 1132 is configured to store data and a program. The program used for performing the method performed by the terminal in the foregoing methods may be stored in the storage element 1132, or may not be stored in the storage element 1132. For example, stored in a memory outside the signal processing part 1130. When using the program, the signal processing part 1130 loads the program into a cache for use. The interface circuit 1133 is configured to communicate with the apparatus. The foregoing apparatus may be located in the signal processing part 1130. The signal processing part 1130 may be implemented by a chip. The chip includes at least one processing element and an interface circuit, where the processing element is configured to perform steps performed by the terminal in any handover method provided in the foregoing method embodiments, and the interface circuit is configured to communicate with another apparatus. In an implementation, the units for implementing the steps in the foregoing methods may be implemented in a form of scheduling a program by the processing element. For example, the apparatus includes a processing element and a storage element. The processing element invokes a program stored in the storage element, to perform any handover method provided in the method embodiments. The storage element may be a storage element located on a same chip as the processing element, namely, an on-chip storage element.

In another implementation, the program used for performing the method performed by the foregoing terminal or the network device may be in a storage element located on a different chip from the processing element, namely, an off-chip storage element. In addition, the processing element invokes or loads the program on the on-chip storage element from the off-chip storage element, to invoke and perform any handover method in the foregoing method embodiments.

In another implementation, the units of the terminal or the network device that implement the steps in the foregoing methods may be configured as one or more processing elements. The processing element herein may be an integrated circuit, for example, one or more ASICs, one or more DSPs, one or more FPGAs, or a combination of these types of integrated circuits. These integrated circuits may be integrated together to form a chip.

The units for implementing the steps in the foregoing methods may be integrated together and implemented in a form of a system-on-a-chip (SoC). The SoC chip is configured to implement the foregoing methods. At least one processing element and storage element may be integrated into the chip, and the processing element invokes a program stored in the storage element to implement the foregoing method performed by the terminal or the network device. Alternatively, at least one integrated circuit may be integrated into the chip, to implement the foregoing method performed by the terminal or the network device. Alternatively, with reference to the foregoing implementations, functions of some units may be implemented by invoking a program by the processing element, and functions of some units may be implemented by the integrated circuit.

An embodiment of this application further provides a communication system, including a first access network device and a second access network device. The first access network device may perform the steps performed by the first base station in any handover method provided in the foregoing method embodiments, and the second access network device may perform the steps performed by the second base station in any handover method provided in the foregoing method embodiments.

A person of ordinary skill in the art may understand that all or some of the steps of the method embodiments may be implemented by a program instructing related hardware. The program may be stored in a computer-readable storage medium. When the program is executed, the steps of the method embodiments are performed. The foregoing storage medium includes any medium that can store program code, such as a ROM, a RAM, a magnetic disk, or an optical disc.

The resource described in embodiments of this application may also be referred to as a transmission resource, including one or more of a time domain resource, a frequency domain resource, and a code channel resource. The resource may be used for carrying data or signaling in an uplink communication process or a downlink communication process.

It should be understood that the term "and/or" in this specification describes only an association relationship between associated objects and represents that three relationships may exist. For example, A and/or B may represent the following three cases: Only A exists, both A and B exist, and only B exists.

It should be understood that, in embodiments of the present disclosure, "B corresponding to A" indicates that B is associated with A, and B can be determined based on A. However, it should be further understood that determining B based on A does not mean that B is determined based only on A. B may alternatively be determined based on A and/or other information.

"A plurality of" in embodiments of this application refers to two or more than two.

Descriptions such as "first" and "second" in embodiments of this application are merely used for indicating and distinguishing between described objects, do not show a sequence, do not indicate a specific limitation on a quantity of described objects in embodiments of this application, and cannot constitute any limitation on embodiments of this application.

Unless otherwise specified, "transmission" (transmit/transmission) in embodiments of this application refers to bidirectional transmission, and includes a sending action and/or a receiving action. Specifically, "transmission" in embodiments of this application includes data sending, data receiving, or data sending and receiving. That is, data transmission herein includes uplink data transmission and/or downlink data transmission. Data may include information and/or a signal. The uplink data transmission is uplink information transmission and/or uplink signal transmission, and the downlink data transmission is downlink information transmission and/or downlink signal transmission.

Content of embodiments of this application may be mutually referenced. Unless otherwise stated or there is a logic conflict, terms and/or descriptions in different embodiments are consistent and may be mutually referenced, and technical features in different embodiments may be combined based on an internal logical relationship thereof, to form a new embodiment.

It may be understood that in embodiments of this application, the terminal and/or the network device may perform some or all steps in embodiments of this application. These steps or operations are merely examples. In embodiments of this application, other operations or variations of various operations may be further performed. In addition, the steps may be performed in a sequence different from a sequence presented in embodiments of this application, and not all the operations in embodiments of this application may be performed.

What is claimed is:

1. A handover method applied to a first access network device, comprising:
 - obtaining first information that comprises coverage information of at least one access network device adjacent to the first access network device;
 - receiving route information from a terminal;
 - determining a second access network device from the at least one access network device based on the coverage information of the at least one access network device and the route information; and
 - sending to the second access network device, a handover request for requesting to hand over the terminal from the first access network device to the second access network device;
 - wherein the determining the second access network device from the at least one access network device based on the coverage information of the at least one access network device and the route information, comprises:
 - determining a moving direction of the terminal based on the route information;
 - determining one or more candidate access network devices in the moving direction of the terminal based on the coverage information of the at least one access network device; and
 - determining the second access network device from the candidate access network devices.

2. The method of claim 1, wherein the first information further comprises coverage information of the first access network device.

3. The method of claim 1, wherein coverage information of any one of the at least one access network device comprises at least one of location information of the access network device, or coverage range information of a cell managed by the access network device.

4. The method of claim 1, the method further comprising:
 - receiving a handover request response from the second access network device, wherein the handover request response comprises indication information indicating a possibility that the second access network device provides a communication service for the terminal.

5. The method of claim 1, wherein the obtaining the first information comprises:
 - receiving the first information from operation, administration, and maintenance (OAM).

6. The method of claim 1, wherein the obtaining the first information comprises:
 - receiving the coverage information of the first access network device from operation, administration, and maintenance (OAM); and
 - receiving the coverage information of the at least one access network device from the at least one access network device.

7. A data transmission apparatus, comprising one or more processors to run instructions, enabling the data transmission apparatus to:
 - obtain first information that comprises coverage information of at least one access network device adjacent to a first access network device;
 - receive route information from a terminal;
 - determine a second access network device from the at least one access network device based on the coverage information of the at least one access network device and the route information; and
 - send a handover request to the second access network device, wherein the handover request is used for requesting to hand over the terminal from the first access network device to the second access network device;
 - wherein the determine the second access network device from the at least one access network device based on the coverage information of the at least one access network device and the route information, comprises:
 - determine a moving direction of the terminal based on the route information;
 - determine one or more candidate access network devices in the moving direction of the terminal based on the coverage information of the at least one access network device; and
 - determine the second access network device from the candidate access network devices.

8. The apparatus of claim 7, wherein the first information further comprises coverage information of the first access network device.

9. The apparatus of claim 7, wherein coverage information of any one of the at least one access network device comprises at least one of location information of the access network device, or coverage range information of a cell managed by the access network device.

10. The apparatus of claim 7, wherein the data transmission apparatus is further caused to:
 - receive a handover request response from the second access network device, wherein the handover request response comprises indication information, and the indication information indicates a possibility that the second access network device provides a communication service for the terminal.

11. The apparatus of claim 7, wherein the first information is received from operation, administration, and maintenance (OAM).

12. The apparatus of claim 7, wherein the coverage information of the at least one access network device is received from the at least one access network device; and wherein the first information comprises coverage information of the first access network device received from operation, administration, and maintenance (OAM).

13. A non-transitory computer readable medium storing instructions that are executable by a computer, the non-transitory computer readable medium is applied to a first access network device, and the instructions comprise instructions for:

obtaining first information that comprises coverage information of at least one access network device adjacent to the first access network device;

receiving route information from a terminal;

determining a second access network device from the at least one access network device based on the coverage information of the at least one access network device and the route information; and sending a handover request to the second access network device, wherein the handover request is used for requesting to hand over the terminal from the first access network device to the second access network device;

wherein the determining the second access network device from the at least one access network device based on the coverage information of the at least one access network device and the route information, comprising:

determining a moving direction of the terminal based on the route information;

determining one or more candidate access network devices in the moving direction of the terminal based on the coverage information of the at least one access network device; and determining the second access network device from the candidate access network devices.

14. The non-transitory computer readable medium of claim 13, wherein the first information further comprises coverage information of the first access network device.

15. The non-transitory computer readable medium of claim 13, wherein coverage information of any one of the at least one access network device comprises location information of the access network device, and/or coverage range information of a cell managed by the access network device.

16. The non-transitory computer readable medium of claim 13, wherein the instructions further comprise instructions for:

receiving a handover request response from the second access network device, wherein the handover request response comprises indication information, and the indication information indicates a possibility that the second access network device provides a communication service for the terminal.

17. The non-transitory computer readable medium of claim 13, wherein the obtaining first information comprises:

receiving the first information from operation, administration, and maintenance (OAM).

18. The non-transitory computer readable medium of claim 13, wherein the respective coverage information of the at least one access network device is received from the at least one access network device; and wherein the obtaining first information comprises coverage information of the first access network device received from operation, administration, and maintenance (OAM).

* * * * *